United States Patent
Schroth et al.

(10) Patent No.: US 7,730,760 B2
(45) Date of Patent: Jun. 8, 2010

(54) METHOD FOR CHECKING THE PROPER FUNCTIONING OF A LEVEL INDICATOR

(75) Inventors: Herbert Schroth, Schopfheim (DE); Andreas Mayr, Lörrach (DE); Manfred Hammer, Wehr (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 11/795,755

(22) PCT Filed: Dec. 16, 2005

(86) PCT No.: PCT/EP2005/056857

§ 371 (c)(1),
(2), (4) Date: Jun. 20, 2008

(87) PCT Pub. No.: WO2006/076997

PCT Pub. Date: Jul. 27, 2006

(65) Prior Publication Data

US 2009/0013778 A1 Jan. 15, 2009

(30) Foreign Application Priority Data

Jan. 21, 2005 (DE) .................. 10 2005 003152

(51) Int. Cl.
G01F 25/00 (2006.01)
(52) U.S. Cl. ........................................ 73/1.73
(58) Field of Classification Search ............ 73/1.73; 702/116, 100
See application file for complete search history.

(56) References Cited

U.S. PATENT DOCUMENTS

| 4,700,569 | A | * | 10/1987 | Michalski et al. ......... 73/290 V |
|---|---|---|---|---|
| 5,319,973 | A | * | 6/1994 | Crayton et al. ............ 73/290 V |
| 5,587,969 | A | * | 12/1996 | Kroemer et al. .............. 367/99 |
| 5,734,346 | A | * | 3/1998 | Richardson et al. ......... 342/124 |
| 5,856,953 | A | * | 1/1999 | Durkee ...................... 367/99 |
| 6,047,598 | A | * | 4/2000 | Otto et al. ................ 73/290 V |
| 6,679,115 | B2 | * | 1/2004 | Heidecke .................. 73/290 V |
| 7,209,073 | B2 | * | 4/2007 | Spanke et al. .............. 342/124 |
| 2004/0076079 | A1 | * | 4/2004 | Lyon et al. ................... 367/99 |

FOREIGN PATENT DOCUMENTS

| DE | 44 05 238 | 8/1995 |
|---|---|---|
| EP | 0 670 048 | 9/1995 |
| EP | 0 961 106 | 12/1999 |
| EP | 1 039 273 | 9/2000 |
| WO | WO 2004/010093 | 1/2004 |

* cited by examiner

Primary Examiner—Thomas P Noland
(74) Attorney, Agent, or Firm—Bacon & Thomas, PLLC

(57) ABSTRACT

A method for checking proper functioning of a fill-level measuring device working according to the travel time principle. For this purpose, in predetermined or selectable time intervals (ta), a current measured value curve at a current fill level (hactual) is ascertained; on the basis of the current measured value curve, a current wanted echo signal is determined. Subsequently, on the basis of the current wanted echo signal, an expected value (E) for quality of a wanted echo signal at least one predetermined fill level (hdesired) is ascertained. The ascertained expected value (E) for quality of the wanted echo signal at the predetermined fill level (hdesired) is compared with a predetermined critical value for quality, and an error condition is diagnosed, when the ascertained expected value falls below the critical value for quality.

7 Claims, 3 Drawing Sheets

METHOD FOR CHECKING THE PROPER FUNCTIONING OF A LEVEL INDICATOR

TECHNICAL FIELD

The invention relates to a method for checking the proper functioning of a fill-level measuring device, which ascertains fill level of a fill substance in a container, wherein measuring signals are reflected on a surface and wherein a distance ascertainment is performed on the basis of the travel time of the measuring signals. The measuring signals are preferably ultrasonic signals or microwave signals.

BACKGROUND DISCUSSION

Travel time methods make use of the physical law, whereby the traveled distance is equal to the product of travel time and propagation velocity. In the case of fill level measurement, the traveled distance corresponds to twice the distance between a reference point of the transmitter and the surface of the fill substance. The useful, or wanted, signal, thus the signal reflected on the surface of the fill substance, and its travel time are preferably ascertained on the basis of the so-called echo curve, which represents, in analog or digital form, amplitude of the echo signals as a function of distance from the transmitter. The fill level itself is then obtained from the difference between the known distance of the reference point of the transmitter to the floor of the container and the distance of the surface of the fill substance to the reference point of the transmitter as determined by the measurement.

All known methods can be applied, which enable relatively short distances to be ascertained by means of reflected measuring signals. If the measuring signals are microwaves, then both the pulse radar method and also the frequency modulation continuous wave radar method (FMCW-radar) can be used. Microwave measuring devices using freely radiated, pulsed measuring signals are sold by the assignee, for example under the mark, MICROPILOT. Microwave measuring devices, which guide measuring signals along a conductive element, into, and out of, a container, are sold by the assignee under the mark, LEVELFLEX.

A device type, which works with ultrasonic signals, is sold by the assignee, for example, under the mark, PROSONIC.

Measurement accuracies in the millimeter range are obtained with fill-level measuring devices ascertaining fill level of a medium in a container via the travel time of measuring signals. Apart from the providing of highly accurate measured values, travel-time, fill-level measuring devices are also used in increasing degree for obtaining measured values in areas where very high safety requirements must be fulfilled. By way of example, referenced here are measuring devices fulfilling requirements for functional safety according to IEC 61508 or measuring devices serving for overfill protection according to the German water management law (WHG).

In order, in the case of such critical applications, to assure that the measuring device functions, as such, truly reliably, repeated checking of the correct functioning of the measuring device is an absolute necessity. Especially, it must be regularly checked whether the measuring device is delivering a correct measured value, in the case of use as overfill protection, as characterized by a maximum allowable fill level, or in the case of use as protection against running empty, as characterized by a minimum allowable level.

According to long established practice, in the checking of the measuring device, a certain fill level of the fill substance in the container—in the mentioned cases, the maximum or minimum allowable fill level—is approached in regular increments. In such case, it is checked whether the measuring chain is functioning properly, thus, for example, whether the required alarm is being triggered. Fill-level measuring devices of today can be applied in containers of height up to 30 m. If one takes into consideration the size of the container to be monitored, then it is easy to see that this known and practiced method is very complicated and thus expensive. Especially disturbing is the fact that, for performing the known test method, the running process must be interrupted for the length of the review.

SUMMARY OF THE INVENTION

An object of the invention is to provide a test method for a fill-level measuring device working according to the travel-time principle, in which test method the fill level does not have to be varied.

The object is achieved by the features that: In predetermined or selectable time intervals, a current measured value curve is ascertained at a current fill level; on the basis of the current measured value curve, a current, wanted echo signal is ascertained; on the basis of the current, wanted echo signal, an expected value for the quality of a wanted echo signal at at least one predetermined fill level is ascertained; the ascertained, expected value for the quality of the wanted echo signal at the predetermined fill level is compared with a predetermined critical value for the quality; and an error condition is diagnosed, when the ascertained, expected value falls below the critical value.

In an advantageous further development of the method of the invention, on the basis of the current, wanted echo signal, an expected value for the quality of a wanted echo signal at at least one predetermined fill level lying above the current fill level is ascertained. In this case, it is possible to make a clear statement as to whether the fill-level measuring device can fulfill its responsibility as protection against overfilling according to a pertinent safety standard.

If, in contrast, the fill-level measuring device is used supplementally or alternatively as protection against running empty, then an embodiment of the method of the invention provides that a desired measured value curve is recorded at empty or almost empty container and that, on the basis of the current, wanted echo signal, an expected value for the quality of a wanted echo signal at at least one predetermined fill level is ascertained, taking into consideration the desired measured value curve, with such predetermined fill level lying below the current fill level.

Preferably, the expected value for the quality of a wanted echo signal at a fill level maximally allowed in the container is ascertained; the ascertained, expected value for the quality of the wanted echo signal is then compared with a critical expected value predetermined for the fill level maximally allowed in the container.

Preferably, the expected value for the quality of a wanted echo signal is determined on the basis of the signal amplitude of the current wanted echo signal and on the basis of an ideal echo curve ascertained under predetermined process—and/or system-dependent conditions. The ideal echo curve of a fill-level measuring device describes echo amplitude as a function of distance from the transmitter, as achieved under ideal conditions. Here, it is thus assumed that the fill substance is an ideal reflector. In the case of freely radiated signals, echo amplitude decreases as distance increases, mainly because the power radiated into a solid angular region determined by the directional characteristic is distributed onto an area increasing with distance. In the case of signals guided by a waveguide, the ideal echo curve is determined mainly by attenuation caused by the waveguide. Preferably, signal/noise ratio is applied as expected value for the quality of the wanted echo signal.

Considered especially advantageous in connection with the method of the invention is when, on the basis of the current wanted echo signal, the signal/noise ratio is determined at a greater or maximally allowed fill level in the container and a minimum signal/noise ratio required for the evaluation at the greater or maximally allowed fill level in the container is used as predetermined critical expected value. An analogous manner of proceeding is provided in the case of use of the fill-level measuring device as protection against running empty.

Moreover, it is provided that the expected values ascertained at different points in time for the quality of the wanted echo signal are recorded and that, at predetermined intervals, it is reviewed for purposes of diagnosis whether the determined expected values change over time. A changing of the ascertained expected values leads to early detection of an impending malfunction of the fill-level measuring device. On the basis of the rate of change, a prediction can be made as to when the impending malfunction will lead to the fact that the fill-level measuring device can no longer be used for its prescribed task.

BRIEF DESCRIPTION OF THE DRAWINGS

The invention will now be explained in greater detail on the basis of the drawing, the figures of which show as follows:

FIG. 1a a container-mounted, fill-level measuring device working according to the travel time principle, FIG. 1b a measured value curve produced by the fill-level measuring device shown in FIG. 1a, and FIG. 1c a measured value curve corrected according to the method of the invention;

DETAILED DISCUSSION

Figure 1:
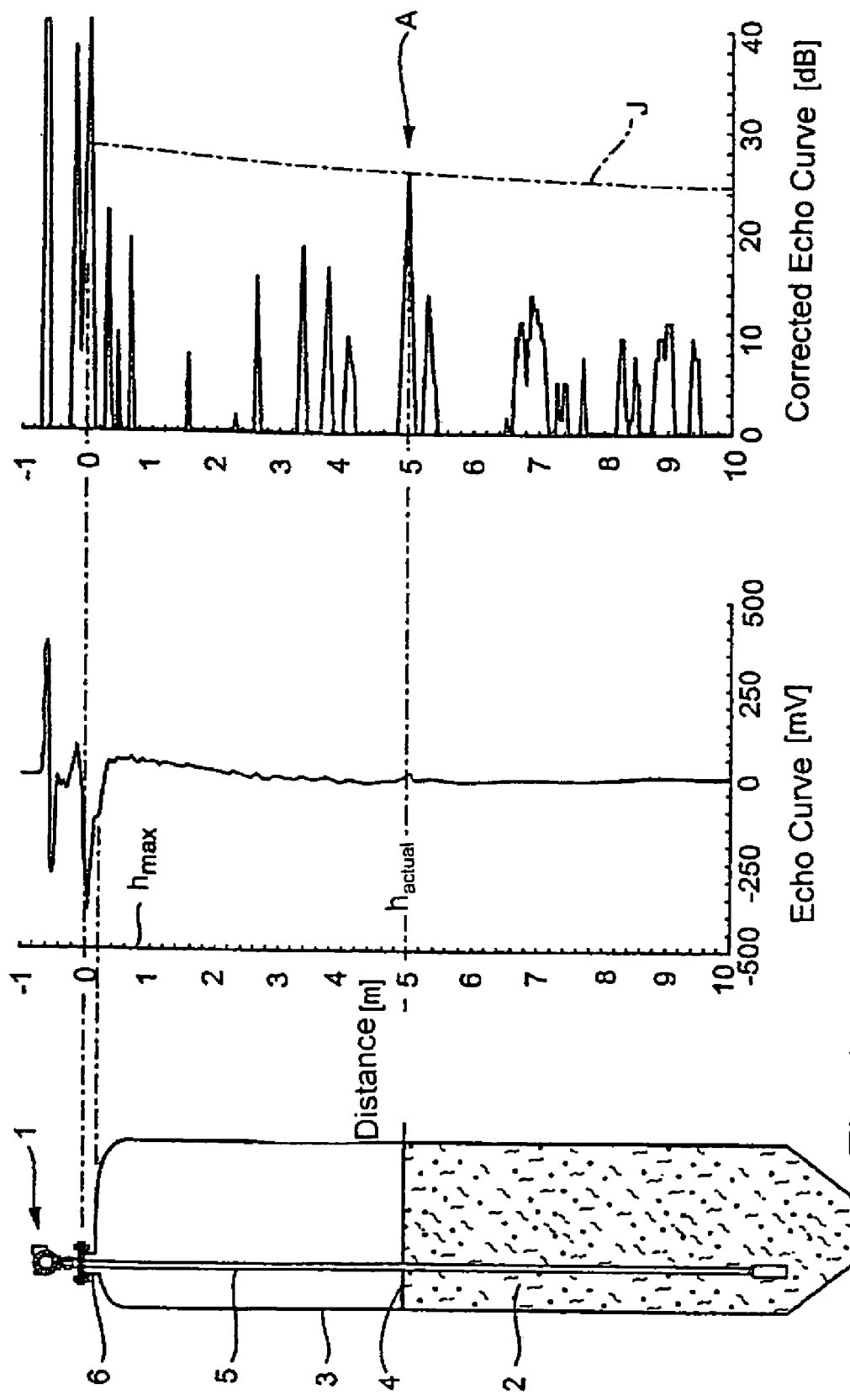
FIG. 1 a schematic drawing illustrating the method of the invention, wherein the subparts of FIG. 1 show as follows.

FIG. 1 illustrates the method of the invention using three different subparts. FIG. 1a shows, mounted on the container 3, a fill-level measuring device 1 working according to the travel time principle. Involved in the illustrated case is a so-called TDR measuring device 1, in the case of which high-frequency measuring signals are guided along a conductive element 5 into, and out of, the container 3. FIG. 1b shows the corresponding measured value curve, the so-called raw, echo curve, recorded by the fill-level measuring device 1 of FIG. 1a. Presented in the echo curve of FIG. 1c is the measured value curve obtained by the method of the invention.

Suitable as reference point for the travel time measurement is, for example, the so-called leakage pulse at −0.6 m distance, which arises by crosstalk of the transmission signal directly into the receiver during the transmission and which is invariant with respect to the kind of fill substance 2 and the particular fill level of the fill substance 2 in the container 3. The disturbance signals between 0 m and 1 m distance are caused by reflections of the measuring signals in the region of the nozzle 6. Usually, these disturbance signals are referred to as "ringing".

The wanted echo signal occurs in FIGS. 1b and 1c on the surface 4 of the fill substance 2 in the container 3. In the illustrated case, the wanted echo signal is more strongly developed then the disturbance echo signals occurring left and right therefrom. These disturbance echo signals are caused, for example, by caking of the fill substance on the conductive element 5.

The measured value curve shown in FIG. 1c has been corrected by subtraction of the empty echo curve from the current measured value curve and then logarithmed for simpler evaluation. Of course, instead of this type of signal conditioning, also other kinds of signal conditioning can be used, such as, for example, correlation, or echo tracing. For calculating the expected value of a wanted echo amplitude, in the illustrated case, the ideal echo curve J is used, which is system-dependent. This ideal echo curve is predetermined by the system. In the drawing, it has been shifted in parallel in such a manner that it runs through the maximum of the amplitude of the current wanted echo signal. As already mentioned, each type of fill-level measuring device has a characteristic, system-dependent, ideal echo curve. In the case of a fill-level measuring device freely radiating microwaves, the antenna diameter has a strong influence on the ideal echo curve. In the case of an ultrasonic fill-level measuring device, the ideal echo curve can be strongly influenced by the amount of dust in the container atmosphere.

In the case illustrated in FIG. 1c, one obtains a just still acceptable, expected value for the signal/noise ratio S/N in the measuring region above the current fill level $h_{actual}$. Preferably used, in this connection, is an echo-finding algorithm that more strongly weights echo signals of larger amplitude, while taking into consideration the signal attenuation of the fill-level measuring device 1. Consequently, it is necessary to take into consideration in the signal evaluation also the particularly applied evaluating algorithm. In FIG. 1c, the disturbance echo signals reach to within about 8 dB of the attenuation curve J. This separation is valued as just still sufficient. If the separation would become smaller in subsequent measurements, then an error report would be issued.

On the basis of subsequently recorded, measured value curves, it is possible, further or supplementally, to ascertain, whether the measured value curves are undergoing a trended change. This information can, for example, be made use of for recognizing a growing accretion formation on the conductive element 5. Of great importance is the use of the method of the invention, moreover, when the fill substance itself is changing. Thus, it is generally known, that the amplitude of the wanted echo signal is influenced not only by the traveled distance but also, in the case of high-frequency measuring signals, relatively strongly by the dielectric properties of the fill substance. Also for such case, proper functioning of the fill-level measuring device can be checked, without problem, using the method of the invention.

Figure 2:
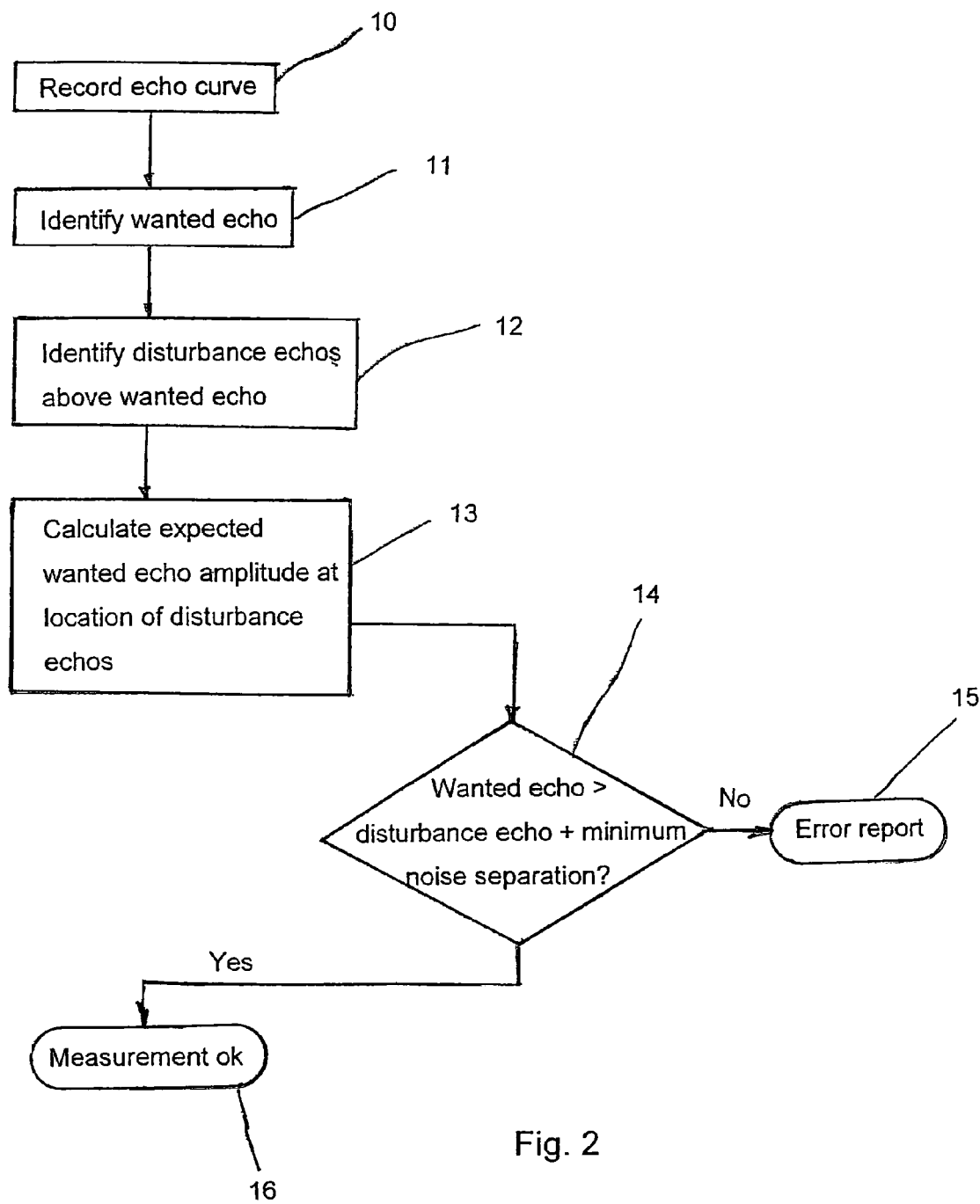
FIG. 2 a flow diagram illustrating the method of the invention in the case of use of the fill-level measuring device as protection against over filling.

FIG. 2 shows a flow diagram representing the method of the invention over one working cycle in the case of use of the fill-level measuring device 1 as protection against overfilling. Of course, any predetermined fill level can be monitored by means of the method of the invention. At program point 10, the current measured value curve is recorded. In the measured value curve, the current wanted echo signal is identified at point 11. Then, the disturbance echo signals above the wanted echo signal are identified at program point 12. In the case of program point 13, the echo amplitude of a wanted echo signal is calculated at the location of a disturbance echo signal. Subsequently, at branch point 14, it is tested, whether the wanted echo signal is greater than the sum of disturbance echo signal and minimum noise separation. If this condition is not fulfilled, then, at the program point 15, an error report is generated and issued. If the aforementioned condition is fulfilled, then, at program point 16, this is the required proof for the proper functioning of the fill-level measuring device 1.

Figure 3:
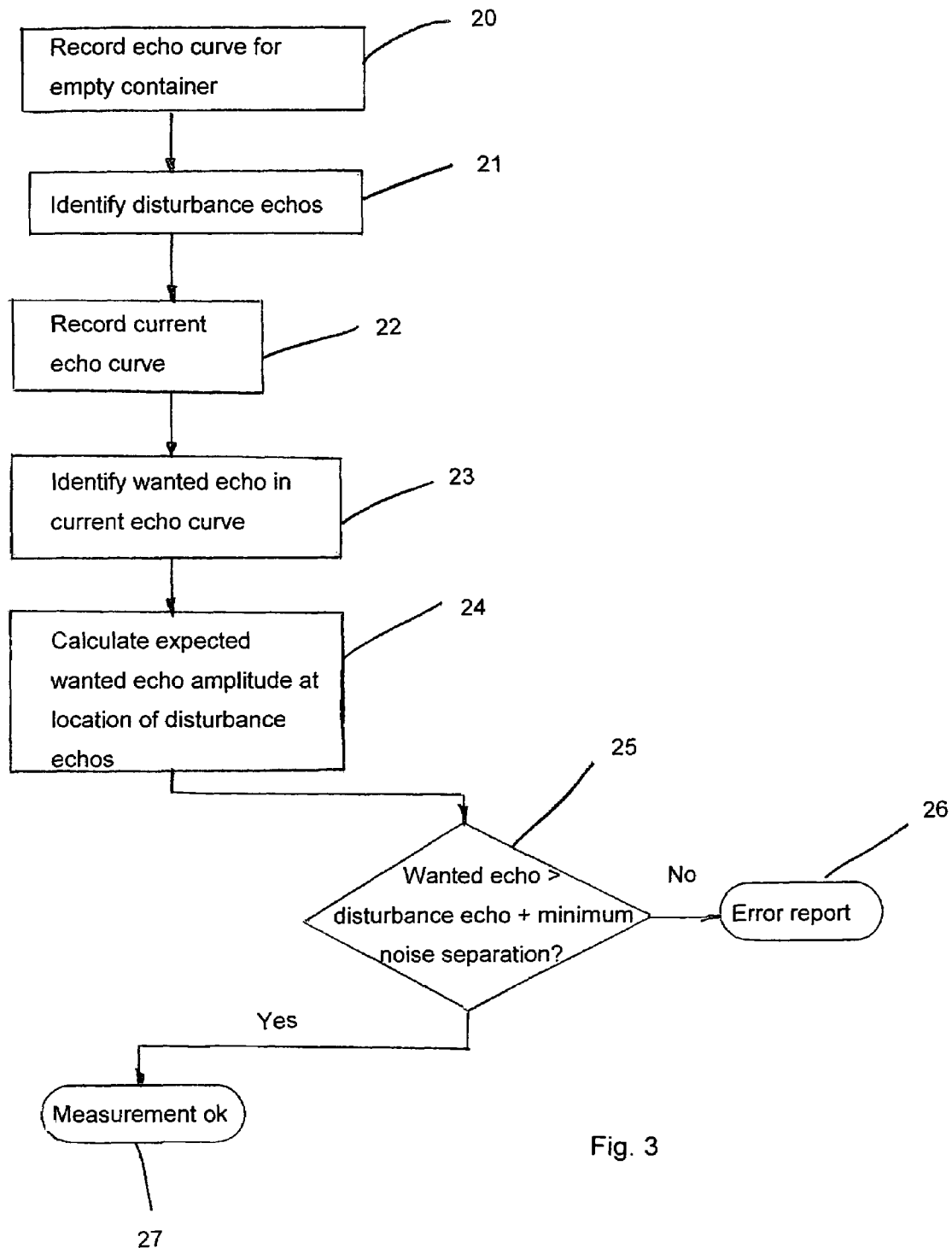
FIG. 3 a flow diagram illustrating the method of the invention in the case of use of the fill-level measuring device as protection against running empty.

FIG. 3 shows a flow diagram describing the method of the invention in the case of use of the fill-level measuring device 1 as e.g. protection against pump running empty. At program point 20, the measured value curve is recorded in the case of empty container 3; following this, the system-dependent, disturbance echo signals are identified on the basis of the empty echo curve, this happening at program point 21. At program point 22, at a later point in time, the current measured value curve is recorded at a fill level $h_{actual}$. The current wanted echo signal is, at point 23, identified in the current measured value curve, possibly by reference against the system-dependent, disturbance echo signals. Subsequently, at program point 24, the amplitude of a wanted echo signal expected, under the given conditions, at the location of the disturbance echo signal, e.g. the greatest disturbance echo signal, is calculated. Then, at the branching point 25, it is tested whether the amplitude of the wanted echo signal is greater than the sum of the disturbance echo signal and the minimum noise separation. If this condition is not fulfilled, then, at program point 26, an error report is generated and issued. If the aforementioned condition is fulfilled, then this is taken as proof of the proper functioning of the fill-level measuring device 1, at program point 27.

Preferably, the method of the invention is automatically executed by a function of the device software. Alternatively, however, a manual execution is possible by the operator, making use of a graphical display of the echo measured value curve, for example on a device display, oscillograph screen or computer monitor. In the case of an automatic embodiment, a malfunction is signaled preferably by a an error report at the signal output of the measuring device, while, in the case of the manual embodiment, such an error report is, of course, not present.

In many cases, it is of advantage to evaluate, as measured value curve, not an echo curve representing the amplitude of the reflected signals as a function of distance, but instead another type of measured value curve. For example, by successive increasing of the amplification in the signal processing branch, it can be determined when an echo signal exceeds a threshold value, and, by a further increasing of the amplification, when, additionally, one or more disturbance echoes exceeds this threshold. In this example, the measured value curve is formed by the tuple of distance of the echo and the associated amplification. In a further example, used as the measured value curve is, likewise, not the echo curve, but, instead, the intermediate frequency signal in the case of FMCW-radar. This signal represents a superpositioning of sinusoidal oscillations, with each frequency being associable with a distance. By frequency-selective filtering, the wanted echo signals can then be separated from the disturbance signals.

A first typical cause for an error condition of a fill-level measuring device according to the travel time method is that the medium 2 has poor reflection characteristics; such can be brought about by a low dielectric constant of the medium 2, in the case of high-frequency measuring signals, or by a low density of the medium 2, in the case of ultrasonic signals, and/or by an unquiet surface, wave formation, boiling bubbles, foam formation, bulk goods cone and/or mirroring reflection to the side.

A further typical cause for an error condition is that strong disturbance echoes are present, caused by installed objects in the container, nozzles, or caking on the fill-level measuring device itself or on parts of the container.

A third typical cause for an error condition is that there are defects in the sensor system, for example brought about by aging, penetrated medium, vibration and/or extreme temperatures.

In applying the method of the invention, it is possible, in many instances, even to diagnose a cause for the error condition. Thus, the above-mentioned first cause of an error condition is evidenced by a low amplitude of the wanted signal, and the second cause by a large amplitude of the disturbance signals. The third time 'cause can bring about both large disturbance signals and also low wanted signals; one can distinguish them from the first two causes, as a rule, by an ever decreasing quality of the measurement over time.

What is claimed is:

1. A method for checking the proper functioning of a fill-level measuring device which determines the fill level of a fill substance in a container, the fill substance defining a substance, comprising the steps of:

transmitting measuring signals toward the surface of the substance at which the measuring signals are reflected;

performing a distance determination, at predetermined or selectable time intervals based on the travel time of the measuring signals;

ascertaining a current wanted echo signal at a current fill level based on the current measured value curve;

ascertaining an expected value for quality of a wanted echo signal at least one predetermined fill level;

ascertaining a signal/noise ratio of a wanted echo signal to disturbance echo signals as the expected value for quality;

predetermining a critical value of a minimum signal/noise ratio for the proper functioning of the fill-level measuring device;

comparing the ascertained expected value for quality of the wanted echo signal at the predetermined fill level with a predetermined critical value for quality; and diagnosing an error condition, when the ascertained expected value falls below the predetermined critical value.

2. The method as claimed in claim 1, further comprising the step of:

ascertaining an expected value for quality of a wanted echo signal at least one predetermined fill level based on the current wanted echo signal, wherein the predetermined fill level lies above the current fill level.

3. The method as claimed in claim 1, further comprising the steps of:

recording a desired measured value curve at empty, or almost empty, container; and ascertaining an expected value for quality of a wanted echo signal at least one predetermined fill level based on the current wanted echo signal taking into consideration the desired measured value curve, wherein the predetermined fill level lies below the current fill level.

4. The method as claimed in claim 1, further comprising the steps of:

ascertaining an expected value for quality of a wanted echo signal at a fill level maximally allowed in the container; and comparing the ascertained and the ascertained expected value for quality of the wanted echo signal with a critical expected value predetermined for the fill level maximally allowable in the container.

5. The method as claimed in claim 1, further comprising the step of:

determining the expected value for quality of a wanted echo signal based on signal amplitude of the current wanted echo signal and based on an ideal echo curve ascertained under predetermined process- and/or system-dependent conditions.

6. The method as claimed in claim 1, further comprising the step of:

ascertaining a signal/noise ratio at a greater or maximally allowed fill level in the container based on the current wanted echo signal, wherein a minimum signal/noise ratio at the greater or maximally allowed fill level in the container is used as predetermined critical expected value.

7. The method as claimed in claim 1, wherein expected values for quality of a wanted echo signal are recorded and checked in predetermined intervals for purpose of diagnosis as to whether the expected values are changing over time.

* * * * *